(12) United States Patent
Sienkiewicz et al.

(10) Patent No.: US 10,449,457 B2
(45) Date of Patent: Oct. 22, 2019

(54) SYSTEM AND METHOD FOR DYNAMIC MATCHMAKING POPULATION HERDING

(75) Inventors: Robert Sienkiewicz, Brighton (GB); Kim Burrows, Brighton (GB); Rowen P. E. Holt, Brighton (GB)

(73) Assignee: Disney Enterprises, Inc., Burbank, CA (US)

( * ) Notice: Subject to any disclaimer, the term of this patent is extended or adjusted under 35 U.S.C. 154(b) by 233 days.

(21) Appl. No.: 13/091,023

(22) Filed: Apr. 20, 2011

(65) Prior Publication Data

US 2012/0270643 A1 Oct. 25, 2012

(51) Int. Cl.
*A63F 13/795* (2014.01)
*A63F 13/48* (2014.01)
*A63F 13/79* (2014.01)
*A63F 13/358* (2014.01)
*A63F 13/35* (2014.01)
*A63F 13/352* (2014.01)

(52) U.S. Cl.
CPC ............ *A63F 13/795* (2014.09); *A63F 13/48* (2014.09); *A63F 13/79* (2014.09); *A63F 13/35* (2014.09); *A63F 13/352* (2014.09); *A63F 13/358* (2014.09); *A63F 2300/5566* (2013.01); *A63F 2300/609* (2013.01); *A63F 2300/636* (2013.01)

(58) Field of Classification Search
CPC ........ A63F 13/00; A63F 13/12; A63F 13/005; A63F 13/10; A63F 13/35; A63F 13/352; A63F 13/358; A63F 13/79; A63F 13/795
USPC ....................... 463/1, 7, 29, 39-43
See application file for complete search history.

(56) References Cited

U.S. PATENT DOCUMENTS

| | | | | |
|---|---|---|---|---|
| 5,575,717 A | * | 11/1996 | Houriet et al. | 463/1 |
| 5,828,843 A | * | 10/1998 | Grimm et al. | 709/228 |
| 6,525,736 B1 | * | 2/2003 | Erikawa et al. | 345/473 |
| 7,305,398 B2 | * | 12/2007 | Teicher | |
| 8,038,535 B2 | * | 10/2011 | Jensen | 463/42 |
| 8,066,568 B2 | * | 11/2011 | O'Kelley et al. | 463/42 |

(Continued)

FOREIGN PATENT DOCUMENTS

| JP | 11235469 A2 | 8/1999 |
|---|---|---|
| JP | 11333137 A2 | 12/1999 |
| JP | 2010246639 A2 | 11/2010 |

OTHER PUBLICATIONS

Dungeon Finder: Call to Arms, Bashiok, Apr. 6, 2011, Blizzard ent., <http://us.battle.net/wow/en/blog/2568337>.*

(Continued)

*Primary Examiner* — Chase E Leichliter
(74) *Attorney, Agent, or Firm* — Patterson + Sheridan, LLP (57) ABSTRACT

Techniques are disclosed for dynamically herding a matchmaking population for a multi-player game. A new player requesting to play a multi-player game is presented with a gameplay selection mode interface based on metrics gathered by monitoring the matchmaking population for the different gameplay modes of the multi-player game. The metrics are evaluated by a metric evaluation engine to determine a configuration of the gameplay mode selection interface that is designed to herd the matchmaking population to evenly balance the players across the different gameplay modes of the multi-player game. A herding incentive may be determined based on the evaluation of the metrics and included in the gameplay mode selection interface.

17 Claims, 5 Drawing Sheets

(56) References Cited

U.S. PATENT DOCUMENTS

| | | | |
|---|---|---|---|
| 2005/0192097 A1* | 9/2005 | Farnham et al. | 463/42 |
| 2006/0121990 A1* | 6/2006 | O'Kelley et al. | 463/42 |
| 2006/0247060 A1* | 11/2006 | Hanson et al. | 463/42 |
| 2007/0191101 A1* | 8/2007 | Coliz et al. | 463/42 |
| 2008/0119277 A1* | 5/2008 | Thelen | 463/42 |
| 2008/0220870 A1* | 9/2008 | Zavolas et al. | 463/40 |
| 2008/0242420 A1* | 10/2008 | Graepel | A63F 13/12 463/42 |
| 2012/0122552 A1* | 5/2012 | Youm | 463/23 |
| 2012/0142429 A1* | 6/2012 | Muller | 463/42 |

OTHER PUBLICATIONS

Article regarding the online game "r2beat," published in Naver websites (URL: <http://cafe.naver.com/division5/241>) on Dec. 16, 2007.

NPL_Japan Patent Office, Office Action dated Nov. 12, 2013.

* cited by examiner

SYSTEM AND METHOD FOR DYNAMIC MATCHMAKING POPULATION HERDING

BACKGROUND

Field of the Invention

The present invention relates to multi-player gameplay and, in particular, to using dynamic matchmaking population herding to balance the number of players between different gameplay modes.

Description of the Related Art

Computer game systems are popular forms of entertainment that present a virtual world within which a player typically controls an actor, e.g., character, avatar, or entity that interacts with other actors in a simulated environment. When the computer game system supports multi-player games, e.g., an online virtual world, other actors are controlled by other players. Some multi-player games have multiple gameplay modes, e.g., different virtual environments with varying content.

When a new player joins a multi-player game, the new player must wait until a minimum number of other new players also join the multi-player game. Once the minimum number is reached, the new players are asked to vote for a gameplay mode in order to select a particular gameplay mode for all of the new players. Unfortunately, the gameplay mode selected by the majority of the new players may not satisfy all of the new players. Particularly players who prefer to have more influence over selection of the gameplay mode.

Alternatively, each new player may select a particular gameplay mode and a matchmaking processing is initiated that matches the new player to an in-progress game in the particular gameplay mode. When an in-progress game is not available, the new player waits until additional new players select the particular gameplay mode and a new game in the particular gameplay mode is started. Allowing each player to specify his/her gameplay mode typically results in an uneven distribution of the players across the different gameplay modes. When a new player wants to play an unpopular gameplay mode, the matchmaking wait time until a new game starts in the unpopular gameplay mode is longer compared with the matchmaking wait time for joining an in-progress game in a popular gameplay mode. Over time, it becomes increasingly difficult to match new players to start a new game in an unpopular gameplay mode, making the unpopular gameplay modes virtually unplayable. As a result, content developers are discouraged from delivering a wide variety of creative content in the form of different gameplay modes. In order to encourage rich and varied content development for multi-player games, it is desirable to more evenly distribute the players across the different gameplay modes. When the players are more evenly distributed across the different gameplay modes, the typical matchmaking wait time for a new player to join a game will converge for the different gameplay modes.

As the foregoing illustrates, there is a need in the art for an improved technique for evenly balancing the players between the different gameplay modes of a multi-player game. Additionally, it is desirable to allow each individual player specify his/her gameplay mode.

SUMMARY

One embodiment of the invention provides a computer implemented method for dynamically herding a matchmaking population for a multi-player game. A new player requesting to play a multi-player game is presented with a gameplay selection mode interface based on metrics gathered by monitoring the matchmaking population for the different gameplay modes of the multi-player game. The metrics are evaluated by a metric evaluation engine to determine a configuration of the gameplay mode selection interface that is designed to herd the matchmaking population to evenly balance the players across the different gameplay modes of the multi-player game. A herding incentive may be determined based on the evaluation of the metrics and included in the gameplay mode selection interface.

An embodiment of the invention includes a computer-implemented method for dynamically herding a matchmaking population for a multi-player game. The method may generally include evaluating one or more metrics of the matchmaking population to produce metric evaluation results and receiving a request from a new player to join a multi-player game having multiple gameplay modes. Based on the metric evaluation results, a gameplay mode selection interface is determined for display to the new player.

Other embodiments include, without limitation, a computer-readable medium that includes instructions that enable a processing unit to implement one or more aspects of the disclosed methods as well as a system configured to implement one or more aspects of the disclosed methods.

One advantage of the techniques described herein is that the number of players is balanced across a variety of different gameplay modes so that the typical matchmaking wait time to start playing a multi-player game in a particular gameplay mode converges. Developers are encouraged to develop a wide variety of creative content for the multi-player games since players will be encouraged through dynamic herding to play new gameplay modes. Conversely, the life of an old gameplay modes may be extended by offering players incentives to play a less popular older gameplay mode. Importantly, a new player may also specify his/her gameplay mode.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF EXEMPLARY EMBODIMENTS

Embodiments of the invention include a system for dynamically herding a matchmaking population for a multi-player game. When a multi-player game has several different gameplay modes, the population of players is spread across those modes and is typically not evenly distributed. As a result, the matchmaking process that identifies a game for a new player to join takes longer for unpopular gameplay modes. Dynamic matchmaking population herding evaluates various metrics such as the population spread and the average matchmaking wait time. These metrics are used to dynamically adjust herding incentives, e.g., rewards, that new players receive for selecting a particular (less popular) gameplay mode. The metrics are also used to configure a gameplay mode selection interface. The herding more evenly distributes the players among the different gameplay modes, and reduces the worst-case matchmaking wait time.

One embodiment of the invention provides a computer-implemented method for dynamically herding a matchmaking population for a multi-player game. The method may generally include evaluating metrics of the matchmaking population to produce metric evaluation results and receiving a request from a new player to join a multi-player game having multiple gameplay modes. Based on the metric evaluation results, a gameplay mode selection interface is determined for display to the new player.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As one skilled in the art will appreciate, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be used. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1A:
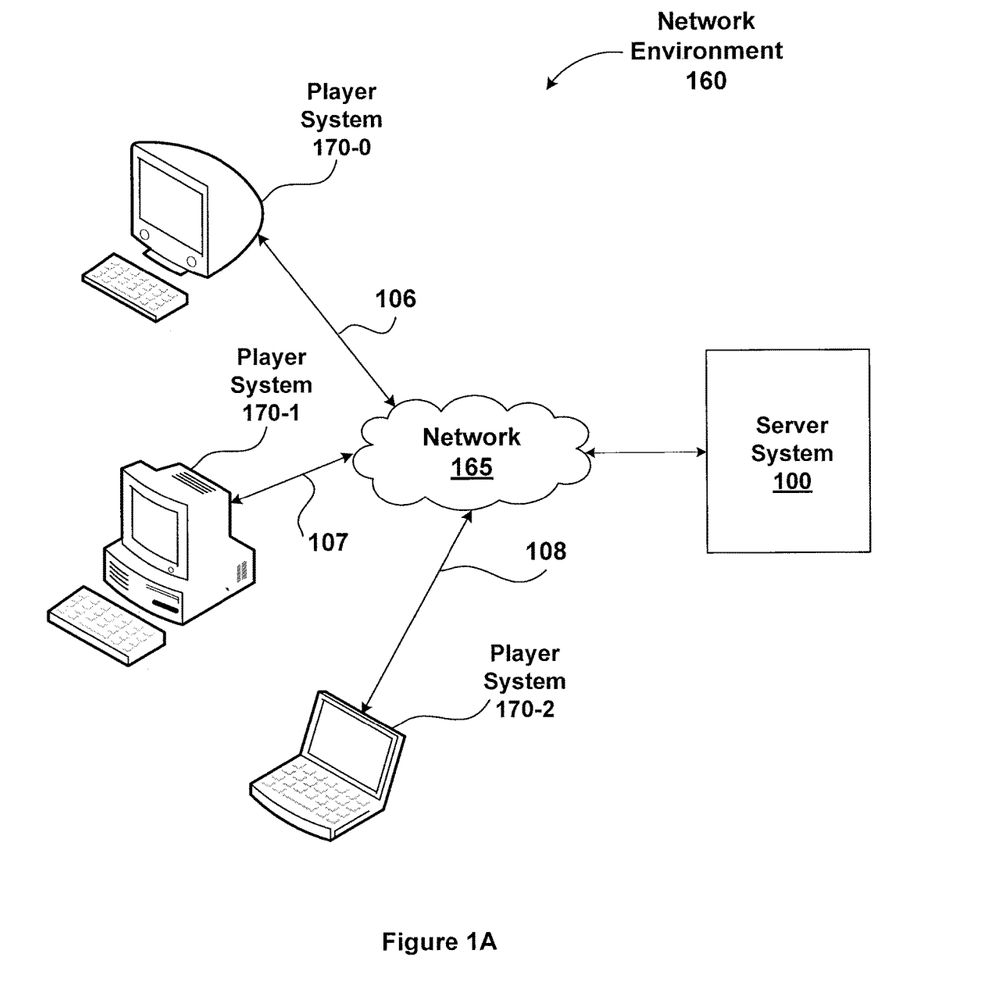
FIG. 1A shows a high-level block diagram of a server system and player systems in the context of network environment, according to one embodiment of the invention.

FIG. 1A shows a high-level block diagram of a server system 100 and player systems 170-0, 170-1, and 170-2 in the context of network environment 160, according to one embodiment of the invention. As illustrated in FIG. 1A, users may connect to the server system 100 through a player system 170, i.e., client. In a typical embodiment, the player system 170-0, the player system 170-1, and the player system 170-2 may be connected through respective network connections 106, 107, and 108 to a network 165. The network 165 may allow the player systems 170 to share resources or information. The network 165 may further allow the player systems 170 to communicate with other computers, and access computer systems and applications stored on a server, for example, system server 100.

In one embodiment, the player system 170-0, player system 170-1, player system 170-2 and server system 100 may reside on separate computers. Each separate computer may include, for example, computer hardware including a processor, memory, address and data buses, and input and output modules. Each separate computer may also include an operating system, system software, application software, and networking capabilities. Each player system 170 is configured to execute a multi-player game application program where a user controls the actions of an actor in the multi-player game.

The multi-player game application may be a game engine that provides graphics and animations associated with a scene or moment in the game. Using the I/O devices, a player system 170 may display a virtual world as instructed by the multi-player game application. The multi-player game application renders a virtual world having virtual locations and virtual actors, including the actor controlled by the user. The multi-player game application may display a three-dimensional map, representing the virtual world and numerous actors through the map, representing both actors controlled by other users in the online environment and non-player, computer-controlled actors.

When a user inputs a command using an input device, the multi-player game application evaluates the command and determines the effect of the command on the execution of the game. Similarly, when an interaction occurs between computer-controlled actors, user controlled actors, and/or objects, the multi-player game application evaluates the interaction and determines the effect of the interaction on the execution of the game. These effects may be reflected in the graphics and animations displayed to the user.

In one embodiment, the server system 100 and player systems 170 may include existing computer systems, e.g., desktop computers, server computers, laptop computers, tablet computers and the like. For example, the server system 100 and/or player systems 170 may comprise a console designed for execution of games, such as an arcade machine, a SONY PLAYSTATION 3, or a MICROSOFT XBOX 360. The server system 100 and/or player systems 170 may also comprise a general computing device configured for execution of games, such as a laptop, desktop, or personal computer.

Graphics and animations for display by the player systems 170 can be created using any number of methods and devices. Modeling software, such as MAYA, sold by AUTODESK, is often used, especially when generating graphics and animations representing a three dimensional environment. Using such software, an animator can create objects and motions for the objects that can be used by the multi-player game application to provide data for display on a display device. Multi-player games typically are configured to operate in a variety of different gameplay modes. Different gameplay modes may be different virtual environments such as a desert, forest, beach, swamp, mountain, mines, and the like. Within each different virtual environment, there may be a variety of different gameplay levels of difficulty or expertise. In some embodiments, each player is associated with an expertise level based on past gameplay and a player may only join a game at a gameplay level that matches the player's expertise level.

Figure 1B:
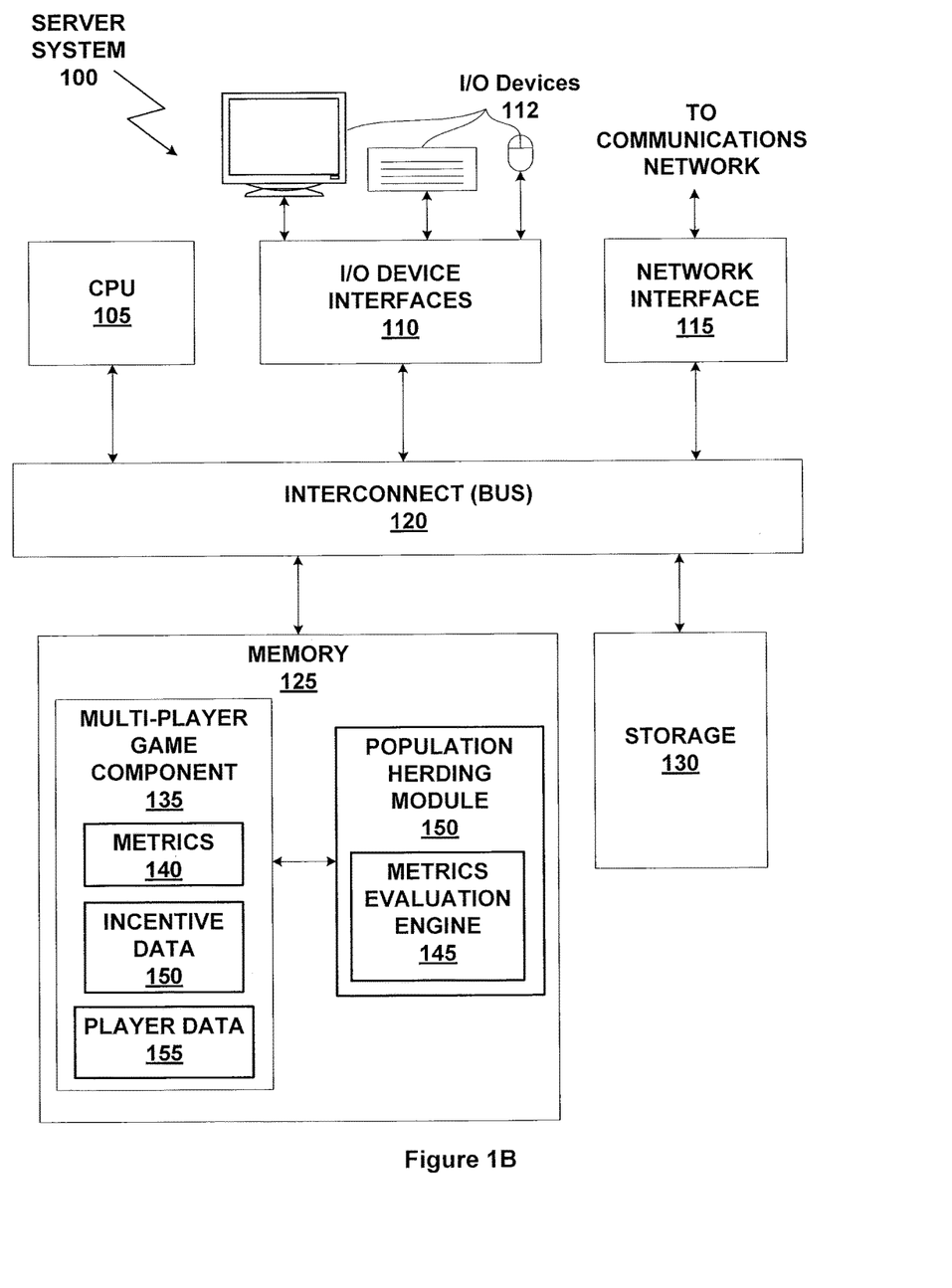
FIG. 1B illustrates the server system of FIG. 1A configured according to one embodiment of the invention.

FIG. 1B illustrates a server system 100 configured according to one embodiment of the invention. The server system 100 illustrated in FIG. 1B, however, is merely an example of one computing environment. Embodiments of the present invention may be implemented differently, regardless of whether the computer systems are complex multi-user computing systems, such as a cluster of individual computers connected by a high-speed network, single-user workstations or network appliances lacking non-volatile storage.

In one embodiment, server system 100 includes a multi-player game component 135 that communicates over the communications network to interact with a multi-player game applications running on the player systems 170. The player systems 170 may be configured to create a connection with the server system 100 and to render a virtual online environment for one or more gameplay modes of the multi-player game. For example, the multi-player game application running on a player system 170 receives commands representing the actions of a player's actor and displays the status and movement of each actor within the multi-player game. The multi-player game component 135 tracks the status and movement of each actor within the multi-player game.

The multi-player game component 135 includes metrics 140, incentive data 150, and player data 155. The metrics 140 comprises data that is monitored by the multi-player game component 135 as multi-player games are played. In particular, metrics 140 stores data indicating the distribution of the matchmaking population across the different gameplay modes, the average, minimum, and maximum matchmaking wait time for each gameplay mode, and the number of new players who stopped attempting to join a game during the matchmaking process for each gameplay mode. The matchmaking wait time is the length of time a player waits while attempting to join a game. The incentive data 150 indicates specific rewards or incentives that may be offered to new players to herd the new players to select a particular gameplay mode that is less popular than other gameplay modes.

The herding incentives are typically specified by the game developer and may be unique to each gameplay mode. Example herding incentives include tools, weapons, increase point earning capability, opportunity to be named "player of the week," increased likelihood of a rare event occurring, presence of extra content, and the like. A point in the context of point earning may include various types of points relating to a score, experience, PvP (Player vs. Player) honor, in-game currency, redeemable tokens, achievement, and the like. For a multi-player battlefield game having five different gameplay modes represented by different maps, a particular vehicle, such as a tank, may only be available in the least popular map as a herding incentive. The player data 155 stores information that is unique to each player, including the player's expertise level and any herding incentives that the player has received for selecting to play in a particular gameplay mode.

The population herding module 150 comprises a metric evaluation engine 145 that receives the metrics 140 from the multi-player game component 135 and evaluates the metrics 140 to generate metric evaluation results. The population herding module 150 determines a gameplay mode selection interface for presentation to a new player based on evaluation of the metrics 140. The population herding module 150 may determine that a herding incentive should be offered for one or more of the gameplay modes in which case the herding incentive will be encoded in the gameplay mode selection interface.

The population herding module 150 is configured to function with a variety of different multi-player game applications by receiving game specific data, such as the incentive data 150 and player data 155 from the multi-player game component 135. In one embodiment, the population herding module 150 may monitor and store the metrics 140 for each different multi-player game. The population herding module 150 may also store the data for each player related to herding incentives associated with the particular player.

The multi-player game component 135 and/or population herding module 150 provided by the server system 100 receives data from multi-player game applications executed by the player systems 170 and sends updates to the multi-player game applications over the communications network. In particular, the population herding module 150 provides the gameplay mode selection interface to a multi-player game application when a new player requests to join a multi-player game.

As shown, the client system 100 includes, without limitation, a central processing unit (CPU) 105, a network interface 115, an interconnect 120, a memory 125, and storage 130. The client computing system 130 may also include an I/O devices interface 110 connecting I/O devices 112 (e.g., keyboard, display and mouse devices). The CPU 105 retrieves and executes programming instructions stored in the memory 125, e.g., the multi-player game component 135 and population herding module 150. The interconnect 120 is used to transmit programming instructions and application data between the CPU 105, I/O devices interface 110, storage 130, network interface 115, and memory 125. CPU 105 is included to be representative of a single CPU, multiple CPUs, a single CPU having multiple processing cores, and the like. And the memory 125 is generally included to be representative of a random access memory. Storage 130, such as a hard disk drive or flash memory storage drive (e.g., a solid state device (SSD)), may store non-volatile data.

Figure 2A:
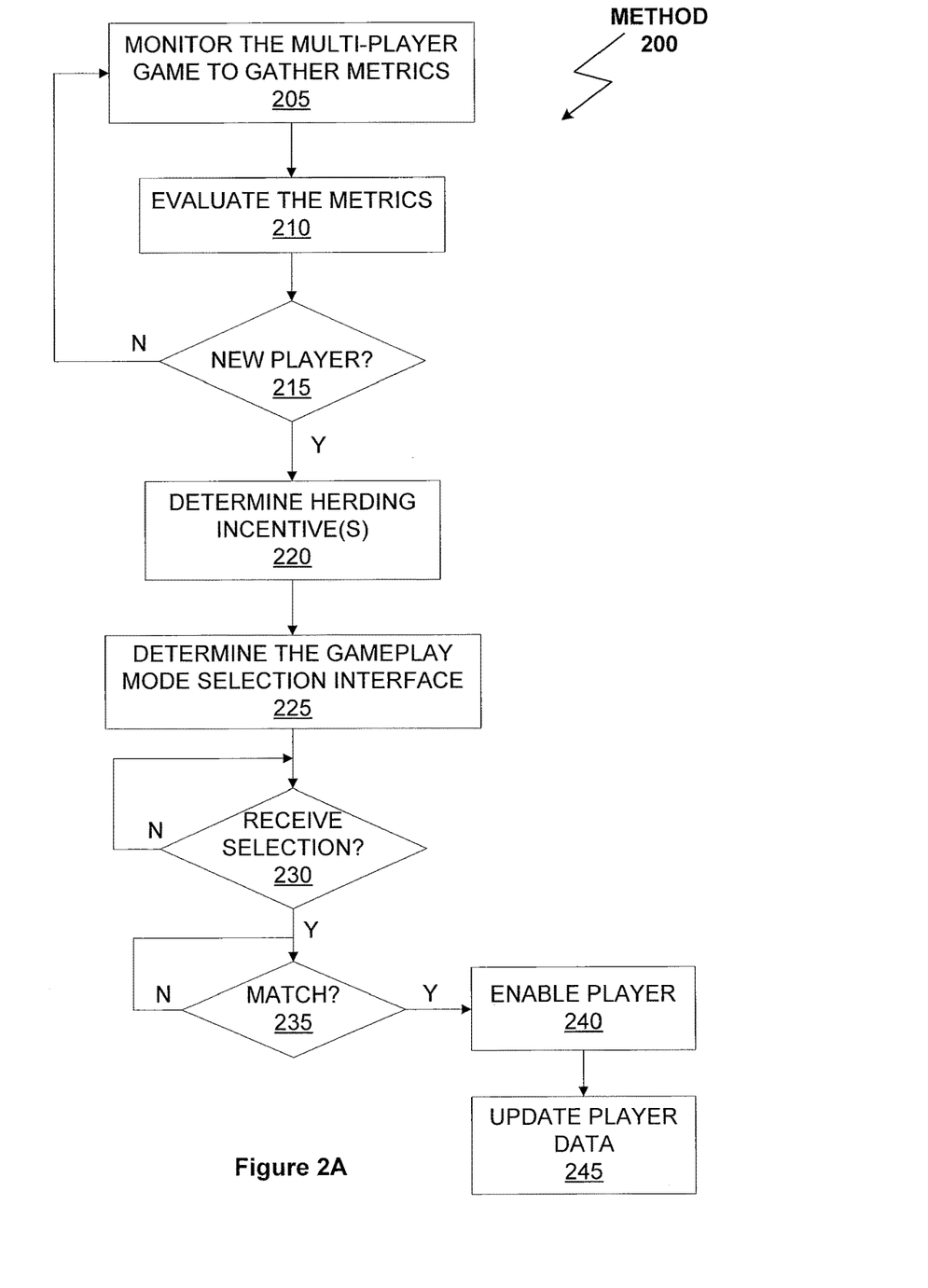
FIG. 2A is a flowchart of method steps describing dynamic herding of a matchmaking population for multi-player gameplay, according to one embodiment of the invention.

FIG. 2A is a flowchart of method steps describing dynamic herding of a matchmaking population for multi-player gameplay, according to one embodiment of the invention. Persons skilled in the art would understand that, even though the method 200 is described in conjunction with the systems of FIGS. 1A and 1B, any system configured to perform the method steps, in any order, is within the scope of embodiments of the invention. In one embodiment, the multi-player game application may perform the method 200. In other embodiments, the multi-player game component 135 or the population herding module 150 may perform the method 200. As shown, the method 200 begins at step 205, where the multi-player game is monitored to gather the metrics 140. In particular, metrics related to the matchmaking population for each gameplay mode of the multi-player game are monitored. At step 210 the matchmaking population metrics are evaluated by the metrics evaluation engine 145 to generate evaluation results. At step 215, if a new player does not request to join a multi-player game, then the population herding module 150 and/or the multi-player game component 135 returns to step 205. Otherwise, at step 220 the population herding module 150 may determine one or more herding incentives based on the metric evaluation result. In some cases, no herding incentive will be determined. For example, when the players are balanced across the different gameplay modes there is no need to provide an incentive to herd the players to an unpopular gameplay mode.

The frequency at which herding incentives are changed may vary so that the dynamic nature of the matchmaking population evolves at different rates. For example, in one embodiment the herding incentives may be determined once per day. In other embodiments the herding incentives may be determined each time a new player requests to join a multi-player game. Still other embodiments may determine the herding incentives once a week, month, or at some other time interval. Similarly, the metrics 140 may be gathered for a time period, e.g., day, week, month, hours, minutes, and the like, and then evaluated at a less frequent rate to generate the metric evaluation results.

At step 225 the population herding module 150 determines the gameplay mode selection interface based on the metric evaluation results. Examples of various gameplay mode selection interfaces are described in conjunction with FIGS. 2B, 2C, 3A, and 3B. In some of the gameplay mode selection interfaces, the herding incentive information may be directly visible to the new player. In other gameplay mode selection interfaces, herding incentives are not used and the new player is herded using techniques that do not rely on herding incentives. Once the gameplay mode selection interface is determined, it is displayed to the new player at the associated player system 170.

At step 230 the population herding module 150 determines if a gameplay mode selection is received from the new player, and if not, then the population herding module 150 remains in step 230. Otherwise, at step 235 the multi-player game component 135 determines if an in-progress multi-player game is available that matches the gameplay mode selected by the new player. If a matching in-progress multi-player game is not available, then the multi-player game component 135 remains in step 235. When a matching in-progress multi-player game becomes available (or a new multi-player game in the selected gameplay mode starts), at step 240 the multi-player game component 135 enables the new player and the population herding module 150 at step 245 the multi-player game component 135 updates the player data 155 if the player received any herding incentives as a result of his/her gameplay mode selection.

If a new player stops attempting to join a game in step 235, the multi-player game component 135 returns to step 205 and updates the metrics 140. In one embodiment, the population herding module 150 records herding data that is used to determine the effectiveness of the herding technique for use in modifying the configuration of the gameplay mode selection interface and herding incentives. Herding data may include changes made to the herding incentives, desired effects of the changes, and actual effects resulting from the changes. The herding data may be used by developers of the multi-player games to choose different herding incentives, identify additional metrics to be monitored, and to design different gameplay mode selection interfaces.

Figure 2B:
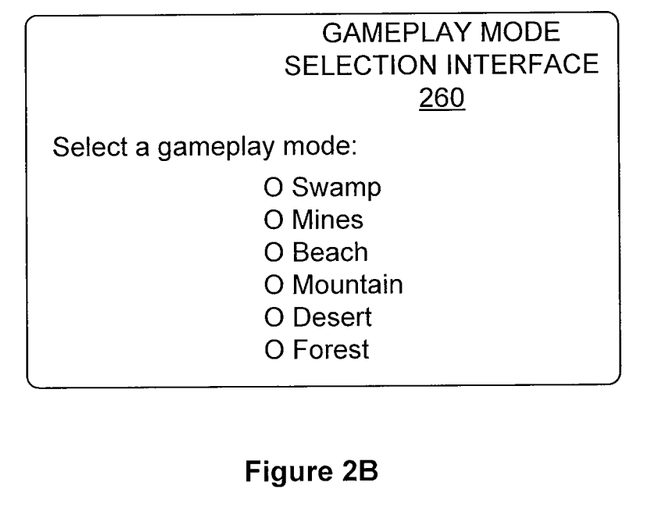
FIG. 2B is a gameplay mode selection interface, according to one embodiment of the invention.

FIG. 2B is a gameplay mode selection interface 260, according to one embodiment of the invention. The population herding module 150 presents the different gameplay modes to the new player in the order of increasing popularity. For example, the swamp gameplay mode is the least popular and the forest gameplay mode is the most popular. Since many new players tend to select the first gameplay mode in a list, the population herding technique of listing the least popular gameplay mode first may successfully evenly distribute the matchmaking population among the different gameplay modes. The gameplay mode selection interface 260 does not rely on herding incentives to herd the new player.

Figure 2C:
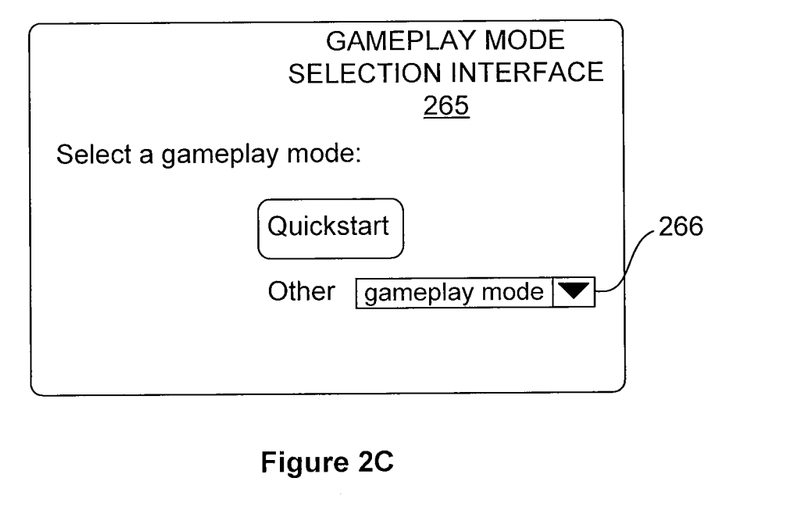
FIG. 2C is another gameplay mode selection interface, according to one embodiment of the invention.

FIG. 2C is another gameplay mode selection interface 265, according to one embodiment of the invention. The population herding module 150 presents a "quickstart" button and a pulldown menu 266 to the new player. The new player may use to the pulldown menu 266 to select a specific gameplay mode instead of simply selecting the unidentified gameplay mode that is associated with the quickstart button. In another embodiment, the pulldown menu 266 is omitted and one or more other buttons are included to provide the new player with an alternative to selecting the "quickstart" button.

The population herding module 150 associates the least popular gameplay mode (hidden from the new player) with the quickstart button. Selection of the quickstart button by a new player automatically selects the gameplay mode which provides the greatest reward. The quickstart button operates as a shortcut button that allows the new player to assume no responsibility in choosing the gameplay mode, thereby minimizing time spent deciding between different gameplay modes. Since many new players may select the quickstart button, this population herding technique may successfully evenly distribute the matchmaking population among the different gameplay modes. Like gameplay mode selection interface 260, gameplay mode selection interface 265 also does not rely on herding incentives to herd the new player. When many new players do use the quickstart button to select their gameplay mode, the availability of servers, rooms, and sessions for the new player to join improves, resulting in a quick entry into a game. Thus, selection of the quickstart button may also allow the new player to start more quickly than if he were to select a particular gameplay mode.

Figure 3A:
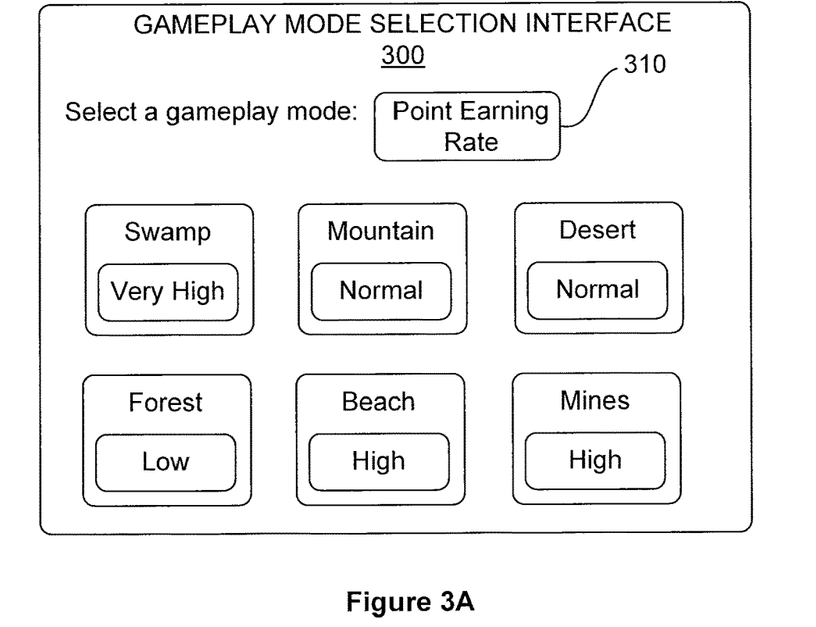
FIG. 3A is a gameplay mode selection interface including a herding incentive, according to one embodiment of the invention.

FIG. 3A is a gameplay mode selection interface 300 including a herding incentive, according to one embodiment of the invention. The gameplay mode selection interface 300 does rely on herding incentives to herd the new player and the herding incentives are directly presented to the new player. A point earning rate 310 herding incentive is used by the population herding module 150 to herd the new players to the least popular gameplay mode or to a less popular gameplay mode. In particular, the swamp gameplay mode is the least popular, and therefore the population herding module 150 applies a herding incentive to the swamp gameplay mode, setting the point earning rate of the swamp gameplay mode at the highest point earning rate potential, shown as "very high."

The beach and mines gameplay modes are more popular than the swamp gameplay mode, but less popular than the other gameplay modes. Therefore, the population herding module 150 applies a herding incentive to the beach and mines gameplay modes, setting the point earning rate of the beach and mines gameplay modes at the high point earning rate potential, shown as "high." The forest gameplay mode is the most popular, and therefore the population herding module 150 does not apply a herding incentive to the forest gameplay mode, setting the point earning rate of the swamp gameplay mode at the low point earning rate potential, shown as "low." Finally, the mountain and desert gameplay modes are more popular than the swamp, beach, and mines gameplay modes, but less popular than the forest gameplay mode. Therefore, the population herding module 150 does not apply a herding incentive to the mountain and desert gameplay modes, setting the point earning rate of the mountain and desert gameplay modes at the normal point earning rate potential, shown as "normal." When the new player selects one of the gameplay modes any herding incentive associated with the gameplay mode is stored with the player data 155 and is applied or available to the player for the duration of the multi-player game.

Figure 3B:
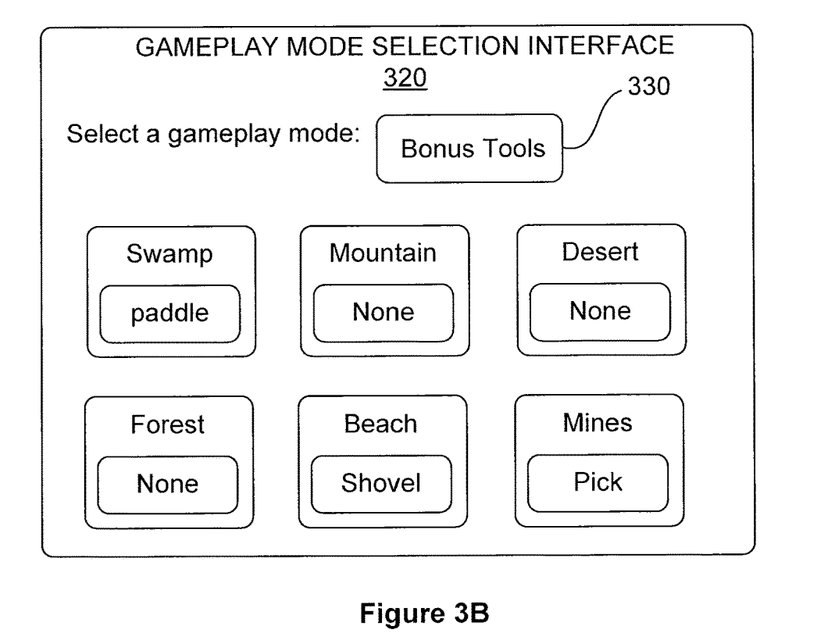
FIG. 3B is another gameplay mode selection interface including a herding incentive, according to one embodiment of the invention.

FIG. 3B is another gameplay mode selection interface including a herding incentive, according to one embodiment of the invention. The gameplay mode selection interface 320 does rely on herding incentives to herd the new player and the herding incentives are directly presented to the new player. A bonus tools 330 herding incentive is used by the population herding module 150 to herd the new players to the least popular gameplay mode or to a less popular gameplay mode. In particular, the swamp gameplay mode is the least popular, and therefore the population herding module 150 applies a herding incentive to the swamp gameplay mode, giving the new player a paddle or other reward to use in the swamp gameplay mode.

The beach and mines gameplay modes are more popular than the swamp gameplay mode, but less popular than the other gameplay modes. Therefore, the population herding module 150 applies a herding incentive to the beach and mines gameplay modes, giving the new player a shovel and a pick, respectively. The forest gameplay mode is the most popular, and therefore the population herding module 150 does not apply a herding incentive to the forest gameplay mode. Finally, the mountain and desert gameplay modes are more popular than the swamp, beach, and mines gameplay modes, but less popular than the forest gameplay mode. Therefore, the population herding module 150 does not apply a herding incentive to the mountain and desert gameplay modes. When the new player selects one of the gameplay modes any herding incentive associated with the gameplay mode is stored with the player data 155 and is applied or available to the player for the duration of the multi-player game.

Advantageously, embodiments of the invention described above may be used to herd the matchmaking population to evenly balance the players across the different gameplay modes of the multi-player game. Additionally, the metrics may be monitored and used to dynamically determine the configuration of the gameplay mode selection interface and herding incentives. Herding data may be recorded that is used to determine the effectiveness of the herding technique for use in modifying the configuration of the gameplay mode selection interface and herding incentives. The herding data may be used by developers of the multi-player games to choose different herding incentives, identify additional metrics to be monitored, and to design different gameplay mode selection interfaces.

Those skilled in the art will recognize that described systems, devices, components, methods, or algorithms may be implemented using a variety of configurations or steps. No single example described above constitutes a limiting configuration or number of steps. For example, configurations of the system 100 exist in which the described examples of components therein may be implemented as electronic hardware, computer software, or a combination of both. Illustrative examples have been described above in general terms of functionality. More or less components or steps may be implemented without deviating from the scope of this disclosure. Those skilled in the art will realize varying ways for implementing the described functionality, but such implementation should not be interpreted as a departure from the scope of this disclosure.

The invention has been described above with reference to specific embodiments and numerous specific details are set forth to provide a more thorough understanding of the invention. Persons skilled in the art, however, will understand that various modifications and changes may be made thereto without departing from the broader spirit and scope of the invention. The foregoing description and drawings are, accordingly, to be regarded in an illustrative rather than a restrictive sense.

What is claimed is:

1. A computer-implemented method for dynamically herding a matchmaking population for a multi-player electronic video game, the method comprising:

collecting data, at a gaming server, for the multi-play electronic video game;

evaluating the data collected by the gaming server for the multi-player electronic video game and specifying one or more metrics of the matchmaking population, to produce metric evaluation results;

receiving, at the gaming server, over a data communications network, an electronic request from a new player to join an instance of the multi-player electronic video game having multiple gameplay modes;

determining, dynamically by the gaming server, at least one herding incentive for a first one of the multiple gameplay modes, based on the metric evaluation results indicating that the first gameplay mode is a less popular gameplay mode, wherein the metric evaluation results include data indicating the number of new players that have stopped attempting to join a game after selecting one of the multiple gameplay modes, relative to at least a second one of the multiple gameplay modes, wherein the at least one herding incentive is adapted to encourage more players to play the first gameplay mode;

causing a gaming client corresponding to the new player to dynamically generate and output for display a gameplay mode selection interface that includes a quickstart button, wherein the gameplay mode selection interface hides an association between the quickstart button and the first gameplay mode from the new player, and wherein the gaming client, when the quickstart button is selected, automatically transmits a selection of the first gameplay mode to the gaming server;

upon receiving, at the gaming server, from the gaming client, a selection of the first gameplay mode, determining that an in-progress multi-player game session is available that matches the first gameplay mode;

enabling the new player to join the in-progress multi-player game session;

updating player data maintained for the new player by the gaming server, to grant the herding incentive to the new player for a duration of the in-progress multi-player game session, as a result of the selection of the first gameplay mode; and modifying game play for the new player for the duration of the in-progress multi-player game session based on the herding incentive.

2. The method of claim 1, wherein determining that the first gameplay mode is the less popular gameplay mode, is based on a number of players currently playing the first gameplay mode.

3. The method of claim 1, wherein the herding incentive comprises a weapon or tool that the new player can use in the first gameplay mode and wherein modifying game play for the new player for the duration of the in-progress multi-player game session based on the herding incentive includes modifying game play to allow use of the weapon or tool by the new player for the duration of the in-progress multi-player game session.

4. The method of claim 1, further comprising associating the herding incentive with the new player when the new player selects the first gameplay mode.

5. The method of claim 1, wherein the gameplay mode selection interface comprises a list of the multiple gameplay modes for the multi-player game that indicates the herding incentive is associated with the first gameplay mode.

6. The method of claim 1, wherein modifying game play for the new player for the duration of the in-progress multi-player game session based on the herding incentive includes at least one of: increasing a point earning rate for the new player for the duration of the in-progress multi-player game session, increasing a likelihood of a rare event occurring for the duration of the in-progress multi-player game session, and presenting extra content during the in-progress multi-player game session.

7. The method of claim 1, further comprising recording herding data that is used to determine effectiveness of the gameplay mode selection interface and the herding incentive.

8. The method of claim 1, further comprising monitoring the multi-player game to gather the one or more metrics.

9. The method of claim 1, wherein the gameplay mode selection interface includes a list of the multiple gameplay modes for the multi-player game that orders the multiple gameplay modes in increasing popularity.

10. The method of claim 1, wherein the one or more metrics comprise data indicating the distribution of players among the multiple gameplay modes.

11. The method of claim 1, wherein the one or more metrics comprise data indicating how long new players have waited while attempting to join a game in each of the multiple gameplay modes after selecting one of the multiple gameplay modes.

12. The method of claim 1, wherein the multiple gameplay modes are different maps for the multi-player game.

13. A system comprising:

a processor;

a memory, wherein the memory includes a population herding module configured to dynamically herd a matchmaking population for a multi-player electronic video game by performing an operation, the operation comprising:

collecting data, at a gaming server, for the multi-play electronic video game;

evaluating the data collected by the gaming server for the multi-player electronic video game and specifying one or more metrics of the matchmaking population, to produce metric evaluation results;

receiving, at the gaming server, over a data communications network, an electronic request from a new player to join an instance of the multi-player electronic video game having multiple gameplay modes;

determining, dynamically by the gaming server, at least one herding incentive for a first one of the multiple gameplay modes, based on the metric evaluation results indicating that the first gameplay mode is a less popular gameplay mode, wherein the metric evaluation results include data indicating the number of new players that have stopped attempting to join a game after selecting one of the multiple gameplay modes, relative to at least a second one of the multiple gameplay modes, wherein the at least one herding incentive is adapted to encourage more players to play the first gameplay mode;

causing a gaming client corresponding to the new player to dynamically generate and output for display a gameplay mode selection interface that includes a quickstart button, wherein the gameplay mode selection interface hides an association between the quickstart button and the first gameplay mode from the new player, and wherein the gaming client, when the quickstart button is selected, automatically transmits a selection of the first gameplay mode to the gaming server;

upon receiving, at the gaming server, from the gaming client, a selection of the first gameplay mode, determining that an in-progress multi-player game session is available that matches the first gameplay mode;

enabling the new player to join the in-progress multi-player game session;

updating player data maintained for the new player by the gaming server, to grant the herding incentive to the new player for a duration of the in-progress multi-player game session, as a result of the selection of the first gameplay mode; and modifying game play for the new player for the duration of the in-progress multi-player game session based on the herding incentive.

14. The system of claim 13, wherein modifying game play for the new player for the duration of the in-progress multi-player game session based on the herding incentive includes at least one of: increasing a point earning rate for the new player for the duration of the in-progress multi-player game session, increasing a likelihood of a rare event occurring for the duration of the in-progress multi-player game session, presenting extra content during the in-progress multi-player game session, and modifying game play to allow use of an additional weapon or tool by the new player for the duration of the in-progress multi-player game session.

15. A non-transitory computer-readable storage medium storing instructions that, when executed by a processor, cause a computer system to dynamically herd a matchmaking population for a multi-player electronic video game, by performing an operation comprising:

collecting data, at a gaming server, for the multi-play electronic video game;

evaluating the data collected by the gaming server for the multi-player electronic video game and specifying one or more metrics of the matchmaking population, to produce metric evaluation results;

receiving, at the gaming server, over a data communications network, an electronic request from a new player to join an instance of the multi-player electronic video game having multiple gameplay modes;

determining, dynamically by the gaming server, at least one herding incentive for a first one of the multiple gameplay modes, based on the metric evaluation results indicating that the first gameplay mode is a less popular gameplay mode, wherein the metric evaluation results include data indicating the number of new players that have stopped attempting to join a game after selecting one of the multiple gameplay modes, relative to at least a second one of the multiple gameplay modes, wherein the at least one herding incentive is adapted to encourage more players to play the first gameplay mode;

causing a gaming client corresponding to the new player to dynamically generate and output for display a gameplay mode selection interface that includes a quickstart button, wherein the gameplay mode selection interface hides an association between the quickstart button and the first gameplay mode from the new player, and wherein the gaming client, when the quickstart button is selected, automatically transmits a selection of the first gameplay mode to the gaming server;

upon receiving, at the gaming server, from the gaming client, a selection of the first gameplay mode, determining that an in-progress multi-player game session is available that matches the first gameplay mode;

enabling the new player to join the in-progress multi-player game session;

updating player data maintained for the new player by the gaming server, to grant the herding incentive to the new player for a duration of the in-progress multi-player game session, as a result of the selection of the first gameplay mode; and modifying game play for the new player for the duration of the in-progress multi-player game session based on the herding incentive.

16. The non-transitory computer-readable storage medium of claim 15, further comprising recording herding data that is used to determine effectiveness of the gameplay mode selection interface and the herding incentive.

17. The non-transitory computer-readable storage medium of claim 15, wherein modifying game play for the new player for the duration of the in-progress multi-player game session based on the herding incentive includes at least one of: increasing a point earning rate for the new player for the duration of the in-progress multi-player game session, increasing a likelihood of a rare event occurring for the duration of the in-progress multi-player game session, presenting extra content during the in-progress multi-player game session, and modifying game play to allow use of an additional weapon or tool by the new player for the duration of the in-progress multi-player game session.

* * * * *

UNITED STATES PATENT AND TRADEMARK OFFICE
CERTIFICATE OF CORRECTION

PATENT NO. : 10,449,457 B2
APPLICATION NO. : 13/091023
DATED : October 22, 2019
INVENTOR(S) : Robert Sienkiewicz et al.

Page 1 of 1

It is certified that error appears in the above-identified patent and that said Letters Patent is hereby corrected as shown below:

In the Claims

In Column 11, Line 32, in Claim 1, delete "multi-play" and insert -- multi-player --, therefor.

In Column 12, Line 64, in Claim 13, delete "multi-play" and insert -- multi-player --, therefor.

In Column 13, Line 60, in Claim 15, delete "multi-play" and insert -- multi-player --, therefor.

Signed and Sealed this
Seventh Day of April, 2020

Andrei Iancu
*Director of the United States Patent and Trademark Office*